(12) United States Patent
Saini

(10) Patent No.: US 10,324,679 B2
(45) Date of Patent: *Jun. 18, 2019

(54) METHODS AND SYSTEMS FOR ELECTRONIC INK PROJECTION

(71) Applicant: Microsoft Technology Licensing, LLC, Redmond, WA (US)

(72) Inventor: Shailesh Saini, San Francisco, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/362,189

(22) Filed: Nov. 28, 2016

(65) Prior Publication Data

US 2017/0075643 A1 Mar. 16, 2017

Related U.S. Application Data

(63) Continuation of application No. 13/923,924, filed on Jun. 21, 2013, now Pat. No. 9,535,646.

(Continued)

(51) Int. Cl.
| | | |
|---|---|---|
| G06F 3/041 | (2006.01) |
| G06F 3/14 | (2006.01) |
| H04W 76/10 | (2018.01) |
| G06F 9/451 | (2018.01) |
| G06F 3/0488 | (2013.01) |

(Continued)

(52) U.S. Cl.
CPC ............ *G06F 3/1454* (2013.01); *G06F 3/041* (2013.01); *G06F 3/04883* (2013.01); *G06F 3/1423* (2013.01); *G06F 3/1438* (2013.01); *G06F 9/452* (2018.02); *H04L 67/06* (2013.01);

(Continued)

(58) Field of Classification Search
USPC ......... 345/156, 173, 629, 100, 84, 547, 179, 345/180; 348/578; 715/202
See application file for complete search history.

(56) References Cited

U.S. PATENT DOCUMENTS

| | | |
|---|---|---|
| 5,455,901 A | 10/1995 | Friend et al. |
| 5,465,325 A | 11/1995 | Capps et al. |

(Continued)

FOREIGN PATENT DOCUMENTS

| | | |
|---|---|---|
| CN | 102156569 A | 8/2011 |
| CN | 102547234 A | 7/2012 |

(Continued)

OTHER PUBLICATIONS

"International Preliminary Report on Patentability Issued in PCT Patent Application No. PCT/US2014/041006", dated May 18, 2015, 7 Pages.

(Continued)

*Primary Examiner* — Thuy N Pardo

(57) ABSTRACT

Embodiments of the present disclosure provide methods for transmitting to a display communicatively coupled to a second device electronic ink input data received from a first device. Specifically, embodiments disclosed herein provide translating electronic ink input data based upon one or more output parameters associated with a display. Once the electronic ink input data is translated, electronic ink output data is generated. In certain embodiments, a stream of the electronic ink output data is transmitted to the display.

20 Claims, 15 Drawing Sheets

Related U.S. Application Data

(60) Provisional application No. 61/836,466, filed on Jun. 18, 2013.

(51) Int. Cl.
*H04L 29/08* (2006.01)
*H04L 29/06* (2006.01)

(52) U.S. Cl.
CPC ...... *H04W 76/10* (2018.02); *G09G 2370/022* (2013.01); *G09G 2370/12* (2013.01); *H04L 67/38* (2013.01)

(56) References Cited

U.S. PATENT DOCUMENTS

| | | | |
|---|---|---|---|
| 6,587,587 | B2 | 7/2003 | Altman |
| 7,343,053 | B2 | 3/2008 | Dresevic et al. |
| 7,564,995 | B1 | 7/2009 | Yaeger et al. |
| 8,345,997 | B2 | 1/2013 | Napper |
| 9,535,646 | B2 | 1/2017 | Saini |
| 2005/0024387 | A1* | 2/2005 | Ratnakar ............ G06T 11/60 345/629 |
| 2008/0062141 | A1 | 3/2008 | Chandhri |
| 2008/0170028 | A1* | 7/2008 | Yoshida ............ G09G 3/20 345/100 |
| 2009/0002335 | A1 | 1/2009 | Chandhri |
| 2010/0118200 | A1* | 5/2010 | Gelman ............ G06F 3/041 348/578 |
| 2012/0098733 | A1 | 4/2012 | Masuda et al. |
| 2012/0139836 | A1 | 6/2012 | Naito et al. |
| 2012/0139866 | A1 | 6/2012 | Naito et al. |
| 2012/0229485 | A1 | 9/2012 | Rhodes et al. |
| 2013/0021370 | A1 | 1/2013 | Dunn et al. |
| 2014/0176405 | A1* | 6/2014 | Yoshida ............ G09G 3/20 345/84 |
| 2014/0365850 | A1* | 12/2014 | Maloney ............ G06F 17/211 715/202 |
| 2014/0368447 | A1* | 12/2014 | Saini ............ H04W 76/10 345/173 |
| 2015/0340015 | A1* | 11/2015 | Yoshida ............ G09G 3/20 345/547 |

FOREIGN PATENT DOCUMENTS

| | | |
|---|---|---|
| CN | 102662563 A | 9/2012 |
| EP | 2355471 | 8/2011 |

OTHER PUBLICATIONS

PCT 2nd Written Opinion in International Application PCT/US2014/041006, dated Apr. 1, 2015, 9 pgs.
"Ink-Enabled Apps for Tablet PC", Published on: Dec. 22, 2008, Available at: http://msdn.microsoft.com/en-us/magazine/cc967278.aspx, 7 pages.
"Use ink on a Tablet PC", Retrieved on: Apr. 9, 2013, Available at: http://office.microsoft.com/en-us/powerpoint-help/use-ink-on-a-tablet-pc-HA101841468.aspx, 2 pages.
"Using Windows Tablet PC and Ink Features", Retrieved on: Apr. 9, 2013, Available at: http://files.support.epson.com/htmldocs/bl425wi/bl425wiug/source/interactive/tasks/pen_using_tablet_ink_bl475wi_485wi.html, 1 page.
PCT International Search Report in PCT/US2014/041006, dated Sep. 30, 2014, 10 pages.
U.S. Appl. No. 13/923,924, Amendment and Response dated Mar. 6, 2015, 9 pages.
U.S. Appl. No. 13/923,924, Amendment and Response dated Sep. 8, 2015, 9 pages.
U.S. Appl. No. 13/923,924, Amendment and Response dated Jun. 21, 2016, 11 pages.
U.S. Appl. No. 13/923,924, Notice of Allowance dated Aug. 26, 2016, 8 pages.
U.S. Appl. No. 13/923,924, Office Action dated Nov. 6, 2014, 7 pages.
U.S. Appl. No. 13/923,924, Office Action dated Apr. 8, 2015, 7 pages.
U.S. Appl. No. 13/923,924, Office Action dated Jan. 21, 2016, 9 pages.
"First Office Action and Search Report Issued in Chinese Patent Application No. 201480035129.4", dated Feb. 23, 2018, 13 Pages.
"Second Office Action Issued in Chinese Patent Application No. 201480035129.4", dated Jul. 30, 2018, 11 Pages.
"Office Action Issued in European Patent Application No. 14740000.6", dated Oct. 24, 2018, 5 Pages.
"Office Action Issued in Chinese Patent Application No. 201480035129.4", dated Nov. 29, 2018, 5 Pages.

\* cited by examiner

METHODS AND SYSTEMS FOR ELECTRONIC INK PROJECTION

PRIORITY

This application is a continuation application of U.S. patent application Ser. No. 13/923,924, issued as U.S Pat. No. 9,535,646, filed on Jun. 21, 2013, entitled "Methods and Systems for Electronic Ink Projection," which application claims priority to U.S. Provisional Patent Application No. 61/836,466, filed on Jun. 18, 2013, entitled "Methods and Systems for Electronic Ink Projection," which applications are hereby incorporated by reference in their entireties.

BACKGROUND

Modern presentation methods and systems rely heavily upon interactive tools for interacting with information within a presentation. Such interactive tools may be utilized with presentation software, word processing software, and other applications used to present information. Traditionally, the use of an application program in a social setting such as a classroom, lecture, conference or other shared activity involves the transmission of the application program running on a computer to a display, such as an external monitor or projector. With the advent of various wired and wireless protocols and standards, including but not limited to the Bluetooth and IEEE 802.11 standards, connections between various devices make possible a level of interaction beyond the use of interactive tools such as the laser pointer or mouse cursor that are typically used for interacting with information within a presentation.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Embodiments of the present disclosure provide methods for transmitting to a display communicatively coupled to a second device electronic ink input data received from a first device. Specifically, embodiments disclosed herein provide translating electronic ink input data based upon one or more output parameters associated with a display. Once the electronic ink input data is translated, electronic ink output data is generated. In certain embodiments, a stream of the electronic ink output data is transmitted to the display.

Embodiments may be implemented as a computer process, a computing system or as an article of manufacture such as a computer program product or computer readable media. The computer program product may be computer storage media readable by a computer system and encoding a computer program of instructions for executing a computer process.

BRIEF DESCRIPTION OF THE DRAWINGS

Non-limiting and non-exhaustive embodiments are described with reference to the following Figures in which.

DETAILED DESCRIPTION

Figure 1:
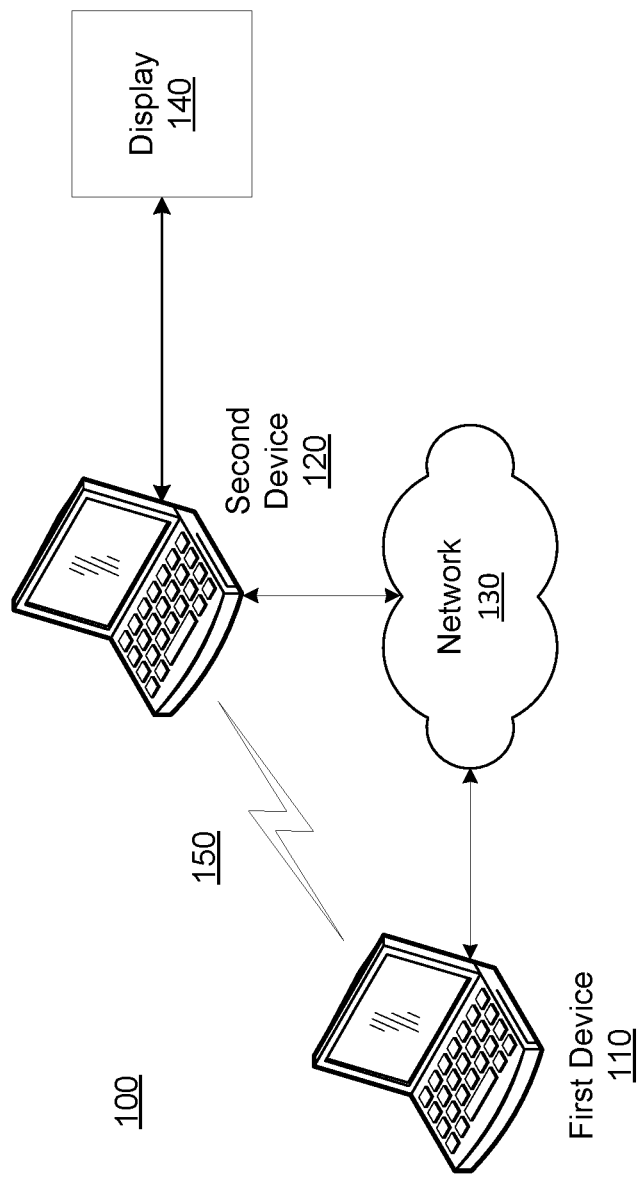
FIG. 1 illustrates a system for transmitting electronic ink data from a first device to a display communicatively coupled to a second device according to one or more embodiments.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

In embodiments described herein, "electronic ink," "e-ink" and "ink" refer generally to data representing, or recognized as, input received from a user's interaction with a touchscreen, touch-sensitive display, or gesture-based interface or input device (e.g., including but not limited to gesture-sensing technology such as technology utilized within the KINECT device by MICROSOFT of Redmond, Wash.). Although embodiments within the remainder of this specification describe use of touch-sensitive displays (e.g., including touchscreens), one of skill in the art will recognize that gesture-based input devices (that is, devices that recognize input based upon gestures from hand movement, facial movement, arm movement and other various types of gesture-based input) are possible and contemplated within the full inventive scope of this disclosure. In one non-limiting example, e-ink may refer to data representing the X-Y coordinates, shape, pressure, or other characteristics of input received from a user interacting with a touchscreen. In another non-limiting example, e-ink may refer to data representing an interpretation of vector graphics or presentation objects drawn on a touch-sensitive display. In embodiments described herein, a "display" refers generally to a visual output device. One of ordinary skill in the art will appreciate that "display" may refer a variety of visual output devices including but not limited to displays utilizing LED-, LCD-, CRT-, plasma-, and OLED-display technology. As described herein, displays may incorporate one or more computing devices or components of computing devices, including but not limited to processors, memory, communications interfaces, and wireless hardware, including technology conforming to various standards such as the Bluetooth and IEEE 802.11 standards. One of skill in the art will further recognize that one or more application programming interfaces (APIs) may be utilized to represent, recognize, and/or interpret e-ink data.

Based on the above, the embodiments described herein describe systems and methods for transmitting e-ink input data between computing devices for presentation of the e-ink input data on one or more displays. That is, a user's input with a touch-sensitive input device (e.g., a mobile phone or tablet computer) is typically processed by the device such that the user input may be represented as e-ink input data. Accordingly, when e-ink input data is received by the device, the device may transmit the e-ink input data to another device or display in order to display the e-ink input data, e.g., overlaying a currently displayed presentation or application program. For example, a mobile device may generate e-ink input data in response to receiving touch input from a user. The mobile device may then transmit the e-ink input data to another device such as a computer hosting an active presentation, such as a presentation within a POWERPOINT application program by MICROSOFT of Redmond, Wash. Upon receiving the e-ink input data from the mobile device, the computer hosting the active presentation displays the e-ink input data on an external display projecting the presentation.

FIG. 1 illustrates a system 100 for transmitting electronic ink data from a first device to a display communicatively coupled to a second device according to one or more embodiments. Referring to FIG. 1, the system 100 includes a first device 110 and a second device 120. In certain embodiments, the first device 110 and the second device 120 are communicatively coupled over a network connection 130, typically utilizing a local area network (LAN) connection. In other embodiments, the first device 110 and the second device 120 are communicatively coupled over a wireless connection 150, typically utilizing a wide area network (WAN) connection. One of ordinary skill in the art will recognize that the first device 110 and second device 120 may be connected through various combinations of wired and wireless connections. Although two clients are shown, it is contemplated that fewer or additional clients may be connected through the network connection 130. It is further contemplated that the network connection may be further connected to various other computing devices, including but not limited to servers or network storage devices (not shown). Further to the embodiment shown in FIG. 1, the second device 120 is connected to an external display 140 via a wired or wireless (not shown) connection. In an embodiment, first device 110 comprises a mobile computing device and second device 120 comprises either a mobile computing device or a computing device. One of ordinary skill in the art will recognize that first device 110 and second device 120, as well as other devices described within this disclosure, may interchangeably comprise, as the case may be, a mobile computing device or a computing device.

In embodiments, the first device 110 is a mobile computing device (e.g., a mobile phone, tablet or laptop computer) that includes a touch-sensitive display. In an embodiment, the first device 110 is communicatively connected to second device 120 via a wireless connection 150. Further to this embodiment, the first device 110 and second device 120 may display, in part or in whole, a common or shared view or session of an application program, such as POWERPOINT, WORD, or INTERNET EXPLORER application programs by MICROSOFT of Redmond, Wash. In an embodiment, upon interacting with the touch-sensitive display by a user, the first device 110 detects the interaction(s) and processes the interaction(s) as touch input data. In embodiments, the touch input data may represent a series of X-Y coordinates detected from the user interaction with the touch-sensitive display. For example, the touch input data may comprise a data stream of X-Y coordinates, or information representing the same, that represents the interaction of the user with the application program displayed on the first device 110. In other embodiments, the touch input data may represent vector graphics, objects, or other program or input data that represents the interaction of the user with the application program displayed on the first device 110. For example, the user may interact with the application program on the first device 110 such that the user draws or otherwise interacts with the touch-sensitive display displaying a presentation associated with the application program.

In an embodiment, the first device 110 may transmit a stream of touch input data to second device 120, which may receive and process the stream of touch input data. In an embodiment, a stream of touch input data may be processed to extract or otherwise identify the user's drawing or interaction with the touch-sensitive display of the first device 110. In one embodiment, processing may comprise extracting or identifying X-Y coordinates that correspond to the user's touch input. In another embodiment, processing may comprise extracting or identifying shapes such as vector graphics, including the dimensions, location, characteristics or other properties of such graphics. For example, the stream of touch input data may include information identifying the color, pressure, stroke, or shape associated with the touch input, or effects (e.g., post-processing by the first device 110) associated with a user's drawing or interactions with the touch-sensitive display of the first device 110. As another example, the stream of touch input may include information identifying the positional, dimensional, geographic, or temporal characteristics of vector graphics or other touch input data associated with the user's drawing or interactions with the touch-sensitive display of first device 110.

In an embodiment, second device 120 processes the received touch input data into a data stream for transmission to a display, such as, for example, display 140. For example, processing of the received touch input data from first device 110 may comprise formatting the touch input data for rendering the received data stream on the display 140. The processing may comprise adjusting (e.g., increasing or decreasing) the resolution or other display characteristics of the received touch input data stream to correspond to a profile or other display characteristics associated with the display 140. For example, the viewable dimensions of display 140 may be different than the dimensions of the touch-sensitive display of the first device 110 and thus may require processing to account for the difference in dimensions between the touch-sensitive display and display 140. As another example, the touch input data stream may be received such that it corresponds to a video standard or protocol that may require adjustment or translation into another video standard or protocol for displaying the touch input data on display 140. As yet another example, the touch input data stream may be processed in order to align the touch input with temporal characteristics such as a time, duration, or period associated with the display of a presentation on the display 140. In another example, the touch input data stream may be processed to identify, modify, highlight, or manipulate presentation objects that may correspond to the presentation objects being displayed by the second device 120 on display 140. One of skill in the art will recognize that other types of translation and processing are encompassed within the scope of processing by the second device 120, as discussed herein.

Figure 2:
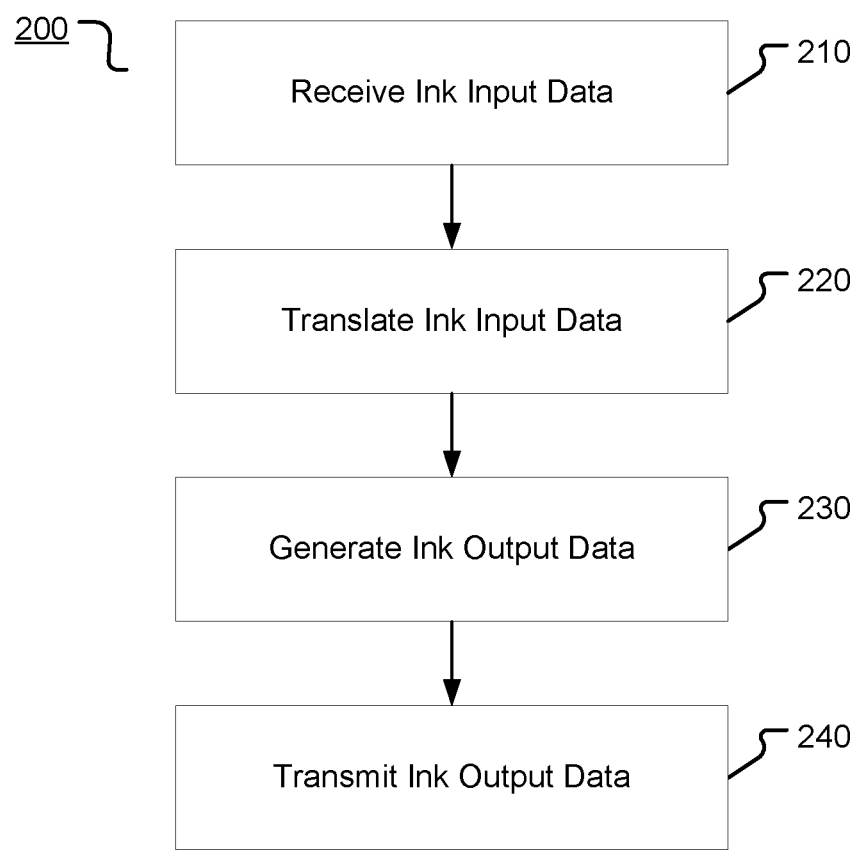
FIG. 2 illustrates a method for transmitting to a display communicatively coupled to a second device electronic ink data received from a first device according to one or more embodiments.

FIG. 2 illustrates a method for transmitting to a display communicatively coupled to a second device electronic ink data received from a first device according to one or more embodiments. Method 200 begins at operation 210 in which ink input data is received. In an embodiment, ink input data may comprise a data stream of X-Y coordinates, vector graphics data, presentation and/or other objects or data, or any combination(s) thereof. Receiving ink input data at operation 210 may comprise receiving data for synchronizing the display of ink input data with a presentation displayed on a display, such as an external display. For example, received ink input data may comprise information that permits displaying ink input data based on the temporal order in which it was rendered on a touch-sensitive display. Further to this example, the received ink input data may permit ink strokes, drawings, and other received information to be displayed on a presentation in the same or similar manner and in the same or similar order as it was received or processed on a touch-sensitive display.

Once the ink input data is received, flow proceeds to operation 220 in which the ink input data is translated or otherwise processed for display on a different display (e.g., a display different from the display communicatively coupled to a device that transmitted the received ink input data stream in operation 210). In an embodiment, translation of the ink input data comprises extracting and analyzing X-Y coordinates against one or more characteristics of a display device and/or the touch-sensitive display or device (or both) that transmitted the ink input data. For example, translation of ink input data may comprise extracting X-Y coordinates. The X-Y coordinates may correspond to a touch-sensitive display having more or less resolution than a display intended for output of the ink input data. In the event an output display has a resolution greater than the touch-sensitive display, translation of the X-Y coordinates may comprise applying algorithms for interpolating, expanding, or otherwise improving the resolution of points or lines between lower resolution X-Y coordinates received from the touch-sensitive display. It is also contemplated that translation of X-Y coordinates may comprise applying algorithms for reducing the resolution of points or lines where, for example, the X-Y coordinates are received from a touch-sensitive display having greater resolution than an output display. In other embodiments, translation may comprise alteration of the properties (e.g., width, texture, color, pressure, stroke shape, brush shape, fill, outlining, highlighting, etc.) of the received ink input data. In another embodiment, translation may comprise identifying presentation objects (e.g., geometric patterns, charts, headings, text boxes, media) or other objects that correspond to objects from an application program displaying the presentation on an output display. In yet another embodiment, translation of ink input data may comprise recognizing the ink input data and passing through the received ink input data in a format or manner that is substantially similar or the same as how it was received in operation 210.

Flow of method 200 then proceeds to operation 230 in which ink output data is generated. In an embodiment, generation of ink output data comprises integrating ink input data received from operation 210 with a presentation for display. In an embodiment, the presentation is actively displayed. In another embodiment, the presentation may be later displayed on a display device. In an embodiment, the display is a device different from the touch-sensitive display and/or device from which the received ink input data was received. For example, generation of ink output data may comprise an application program such as POWERPOINT incorporating the ink output data as part of an output (e.g., a slideshow presentation) of slides for presentation on one or more displays. It is also contemplated that generation of ink output data may comprise packaging the translated ink input data from operation 220 into an output stream, data structure or package of data for transmission to a display. Generation of the ink output data may comprise preparing or conforming the translated ink input data to one or more standards for display on one or more connected displays.

Once the ink output data is generated, flow proceeds to operation 240 in which the ink output data is transmitted to one or more displays. In an embodiment, transmission of the ink output data comprises sending the ink output data integrated with, or incorporated within, data for display of a presentation on one or more display devices. Further to this embodiment, the ink output data may be comprised within or as part of an output (e.g., a slideshow presentation) of slides for presentation on one or more displays. It is also contemplated that the ink output data may be transmitted separate from or interleaved with a presentation transmitted to one or more displays.

Figure 3:
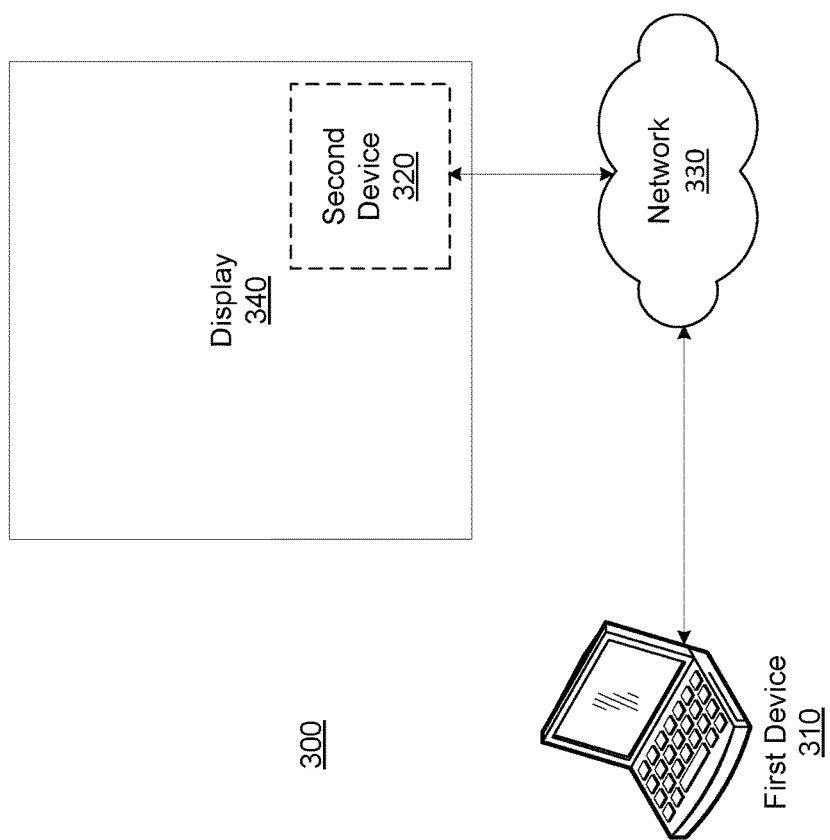
FIG. 3 illustrates a system for transmitting electronic ink data from a first device to a display comprising a second device according to one or more embodiments.

FIG. 3 illustrates a system for transmitting electronic ink data from a first device to a display comprising a second device according to one or more embodiments. Referring to FIG. 3, the system 300 includes a first device 310 and a second device 320 incorporated within display 340. In certain embodiments, the first device 310 and the second device 320 are communicatively coupled over a network connection 330, typically utilizing a local area network (LAN) connection. In other embodiments, the first device 310 and the second device 320 may be communicatively coupled over a wireless connection (not shown). One of ordinary skill in the art will recognize that the first device 310 and second device 320 may be connected through various combinations of wired and wireless connections. Although two clients are shown, it is contemplated that fewer or additional clients may be connected through the network connection 330. It is further contemplated that the network connection may be further connected to various other computing devices, including but not limited to servers or network storage devices (not shown). Further to the embodiment shown in FIG. 3, the second device 320 is incorporated within the display 340. As described herein, a display may incorporate one or more computing devices or components of computing devices, including but not limited to processors, memory, communications interfaces, and wireless hardware, including technology conforming to various standards such as the Bluetooth and IEEE 802.11 standards. As incorporated within display 340, the second device 320 may be comprised of, in whole or in part, a system-on-chip (SOC).

In embodiments, as discussed previously, the second device 320 processes touch input data received from first device 310. For example, processing of the received touch input data from first device 310 may comprise formatting the touch input data for rendering the received data stream on the display 340. The processing may comprise adjusting (e.g., increasing or decreasing) the resolution or other display characteristics of the received touch input data stream to correspond to a profile or other display characteristics associated with the display 340. For example, the touch input data stream may be processed in order to align the touch input with temporal characteristics such as a time, duration, or period associated with the display of a presentation on the display 340. In another example, the touch input data stream may be processed to identify, modify, highlight, or manipulate presentation objects that may correspond to the presentation objects being displayed by the second device 320 on display 340. One of skill in the art will recognize that other types of translation and processing are encompassed within the scope of processing by the second device 320, as discussed herein.

Figure 4:
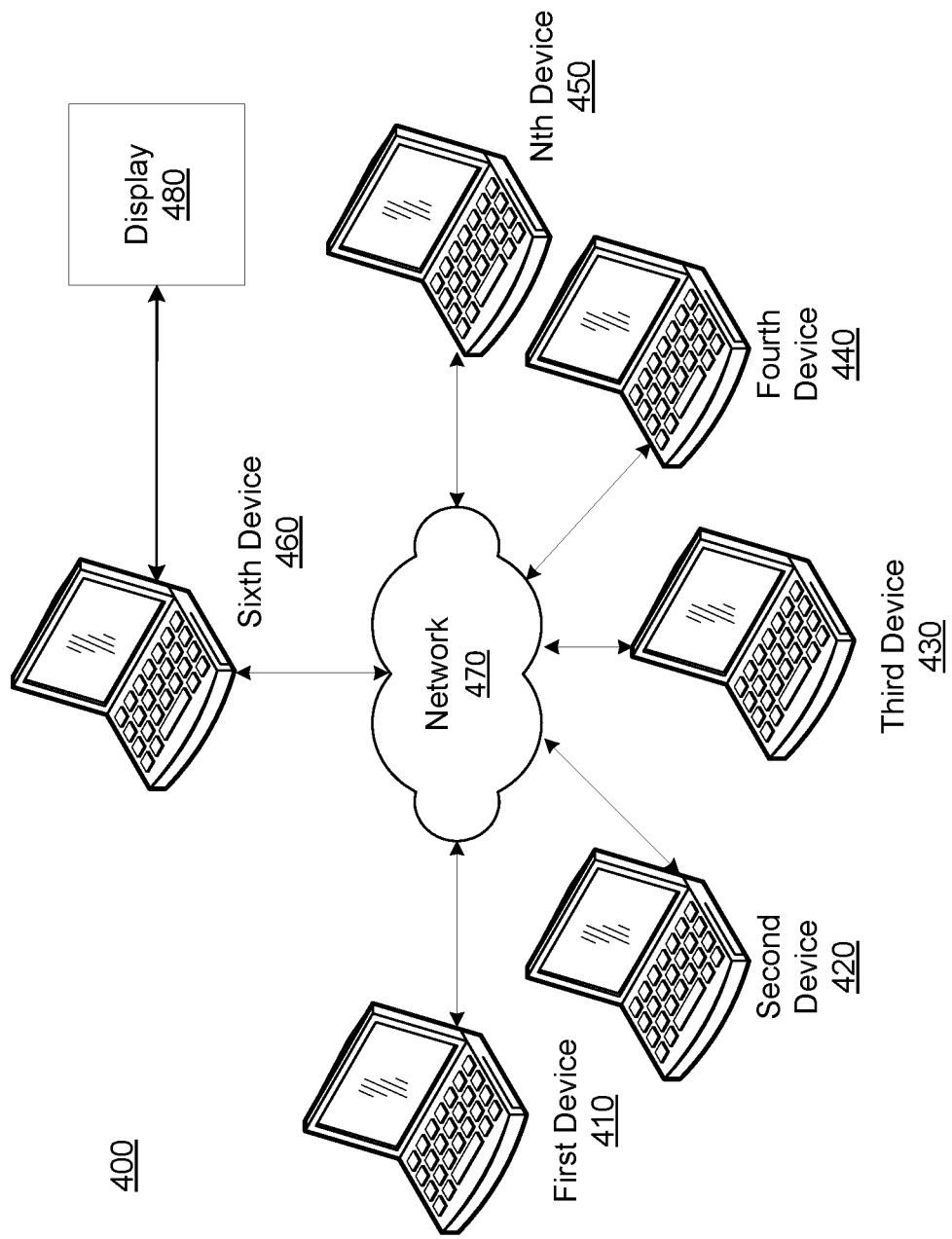
FIG. 4 illustrates a system for transmitting to a display communicatively coupled to a second device electronic ink data received from a plurality of first devices according to one or more embodiments.

FIG. 4 illustrates a system for transmitting to a display communicatively coupled to a second device electronic ink data received from a plurality of first devices according to one or more embodiments. With respect to FIG. 4, the system 400 comprises a plurality of devices (e.g., a first device 410, a second device 420, a third device 430, a fourth device 440, and an Nth device 450) that are communicatively coupled over a network connection 470 to a sixth device 460. In embodiments, the network connection 470 may comprise a local area network (LAN) connection, a wide area network (WAN) connection, or another communications connection.

In an embodiment, sixth device 460 comprises a computing device that hosts a presentation within an application program and displays the presentation on a display 480. In embodiments, the plurality of devices (e.g., a first device 410, a second device 420, a third device 430, a fourth device 440, and an Nth device 450), where each device comprises a touch-sensitive display, may transmit a plurality of streams of touch input data to sixth device 460. In an embodiment, the sixth device 460 may receive and process the plurality of streams of touch input data. In an embodiment, the plurality of streams of touch input data are processed to extract or otherwise identify a user's drawing or interaction with the plurality of touch-sensitive displays corresponding to the plurality of devices (e.g., a first device 410, a second device 420, a third device 430, a fourth device 440, and an Nth device 450). Extraction and identification of a user's drawing or interaction may comprise highlighting with different or identifying colors, text, or objects each of the plurality of streams of touch input data received from the plurality of devices (e.g., a first device 410, a second device 420, a third device 430, a fourth device 440, and an Nth device 450). For example, the sixth device 460 may prepare a touch output data stream (or incorporate within the presentation itself) such that the touch input data received from a subset of the plurality of devices (e.g., first device 410 and second device 420) is highlighted in one color and the touch input data received from another subset of the plurality of devices (e.g., third device 430 and fourth device 440) is highlighted using a different color or colors.

It is contemplated that the interaction of the plurality of devices with the sixth device 460 may be synchronous or asynchronous such that the processing and/or display of touch input data may depend upon a certain or relative ordering or timing. It is further contemplated that the interactions of the plurality of devices with the sixth device 460 may be either bi-directional or uni-directional (not shown), such that when uni-directional the plurality of devices would transmit touch input data for display on display 480 in a collaborative many-to-one (e.g., students-teacher, audience-presenter, etc.) environment. For example, the system 400 may comprise an audience participation environment that enables a user from one or more of the plurality of devices (e.g., a first device 410, a second device 420, a third device 430, a fourth device 440, and an Nth device 450) to write questions, highlight, draw upon, or otherwise interact with a presentation that is hosted on sixth device 460 and displayed on display 480.

In an embodiment, processing by the sixth device 460 may comprise extracting or identifying X-Y coordinates that correspond to a plurality of user touch input. In another embodiment, processing may comprise extracting or identifying shapes such as vector graphics, including the dimensions, location, characteristics or other properties of such graphics. For example, as discussed previously, the streams of touch input data may include information identifying the color, pressure, stroke, or shape associated with the touch input, or effects (e.g., post-processing by the first device 410) associated with a drawing or interaction (e.g., a user's interaction with the touch-sensitive display of the first device 410). As another example, the stream of touch input may include information identifying the positional, dimensional, geographic, or temporal characteristics of vector graphics or other touch input data associated with a drawing or interaction (e.g., a user's drawing or interaction with the touch-sensitive display of first device 410).

Figure 5:
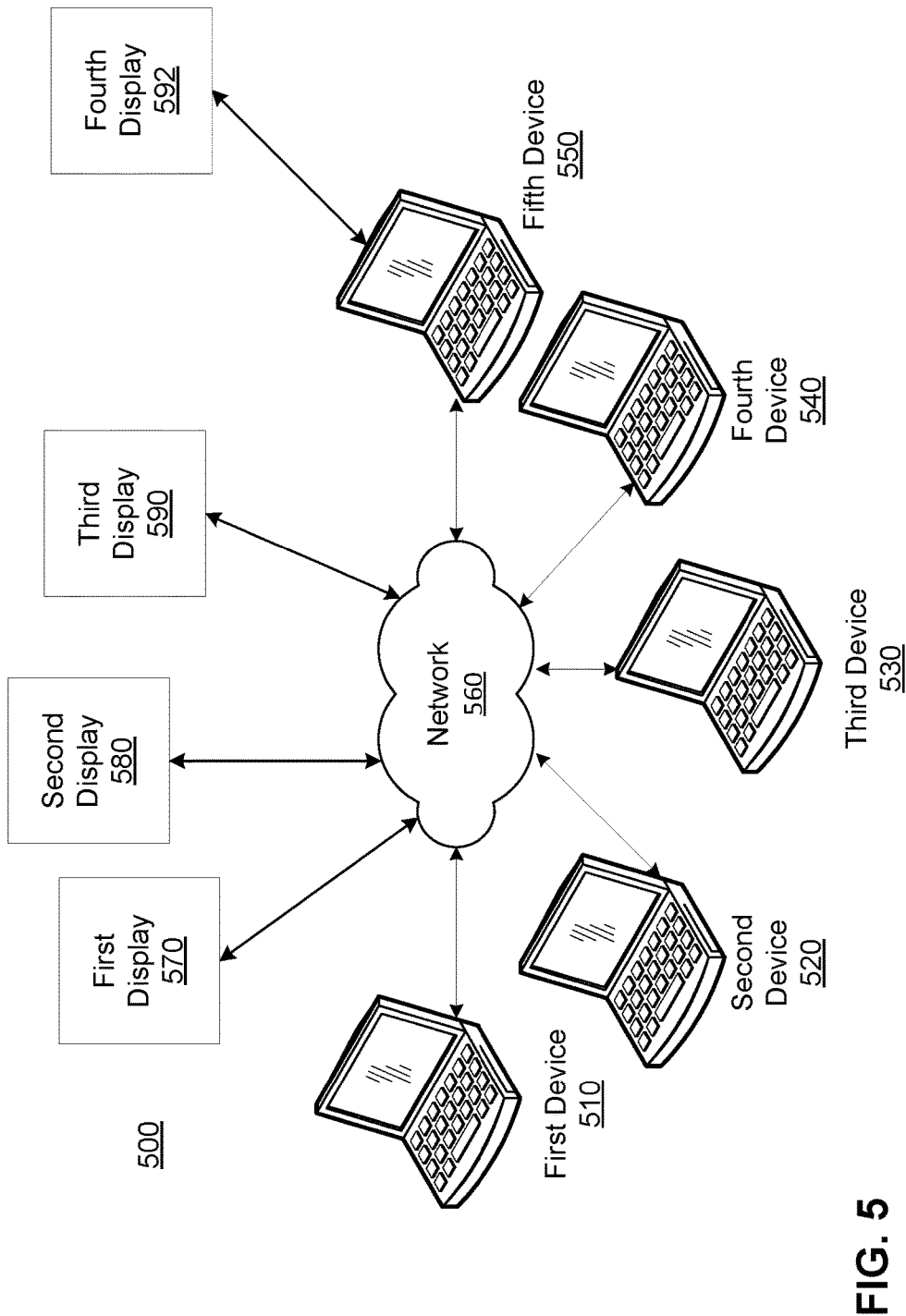
FIG. 5 illustrates a system for transmitting electronic ink data between a plurality of first devices and a plurality of displays according to one or more embodiments.

FIG. 5 illustrates a system for transmitting electronic ink data between a plurality of first devices and a plurality of displays according to one or more embodiments. With respect to FIG. 5, the system 500 comprises a plurality of devices (e.g., a first device 510, a second device 520, a third device 530, a fourth device 540, and a fifth device 550) that are communicatively coupled over a network connection 560 to a plurality of displays (e.g., first display 570, second display 580, and third display 590). In an embodiment, fifth device 550 may be communicatively coupled to a fourth display 592 without utilizing network connection 560. In embodiments, the network connection 560 may comprise a local area network (LAN) connection, a wide area network (WAN) connection, or another communications connection.

In an embodiment, the plurality of devices (e.g., the first device 510, the second device 520, the third device 530, the fourth device 540, and the fifth device 550) comprise computing devices that may host a presentation session within one or more application programs. For example, the plurality of devices (e.g., a first device 510, a second device 520, a third device 530, a fourth device 540, and a fifth device 550) may share a peer-to-peer or other collaborative network connection via the network 560 such that one or more of the plurality of devices may interactively and/or asynchronously interact with (e.g., share data between) one or more of the other plurality of devices. In an embodiment, the plurality of devices (e.g., the first device 510, the second device 520, the third device 530, the fourth device 540, and the fifth device 550) are connected via wired or wireless (not shown) connections to a plurality of displays (e.g., the first display 570, the second display 580, the third display 590 and the fourth display 592). In embodiments, respective ones of the plurality of devices (e.g., the first device 510, the second device 520, the third device 530, the fourth device 540, and the fifth device 550), particularly where each of the respective ones of the plurality of devices comprise a touch-sensitive display, may transmit a plurality of streams of touch input data to respective others of the plurality of devices. In an embodiment, one or more of the plurality of displays (e.g., the first display 570, the second display 580, the third display 590, and the fourth display 592) may further comprise a computing device incorporated within the one or more of the plurality of displays.

In an embodiment, one or more of the plurality of devices (e.g., the first device 510, the second device 520, the third device 530, the fourth device 540, and the fifth device 550) and those of the displays (e.g., the first display 570, the second display 580, the third display 590 and the fourth display 592) that incorporate a computing device may process, as discussed previously, a plurality of streams of touch input data received from one or more of the plurality of devices and the plurality of displays. It is contemplated that the interaction of the plurality of devices with the plurality of displays may be synchronous or asynchronous such that the processing and/or display of touch input data may depend upon a certain or relative ordering or timing. It is further contemplated, as discussed previously, that the interactions of the plurality of devices and the plurality of displays may be either bi-directional or uni-directional (not shown), such that bi-directional interactions may exist between one or more of the plurality of devices and one or more of the plurality of displays in a collaborative many-to-many (e.g., classroom, conference, etc.) environment. For example, the system 500 may comprise a participatory environment that enables real-time interaction that permits participating users to write questions, highlight, draw upon, or otherwise interact with a shared presentation.

Figure 6:
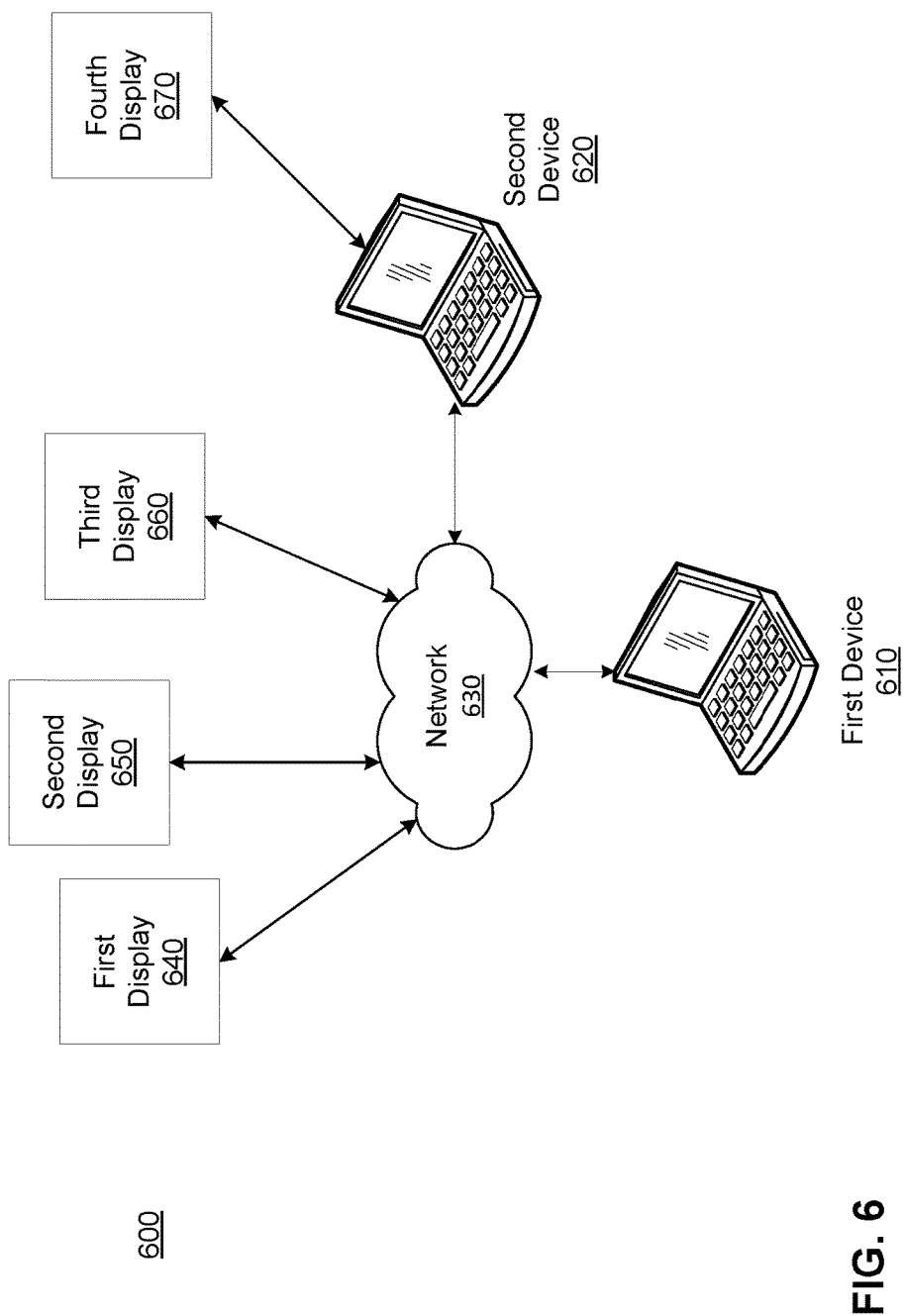
FIG. 6 illustrates a system for transmitting electronic ink data from a first device to a plurality of displays according to one or more embodiments.

FIG. 6 illustrates a system for transmitting electronic ink data from a first device to a plurality of displays according to one or more embodiments. With respect to FIG. 6, the system 600 comprises a first device 610 and a second device 620 that are communicatively coupled over a network connection 630 to a plurality of displays (e.g., first display 640, second display 650, and third display 660). In an embodiment, second device 620 may be communicatively coupled to a fourth display 670 without utilizing network connection 630. In embodiments, the network connection 630 may comprise a local area network (LAN) connection, a wide area network (WAN) connection, or another communications connection.

In an embodiment, the second device 620 comprises a computing device that hosts a presentation session within one or more application programs. Further to this embodiment, the second device 620 may share a peer-to-peer or other collaborative network connection via the network 630 such that one or more of the displays (e.g., first display 640, second display 650, third display 660, and fourth display 670) may interactively and/or asynchronously interact with (e.g., share data between) the second device 620. In an embodiment, the first device 610 and the second device 620 (or both, as the case may be) may transmit a plurality of streams of touch input data to one or more of the displays (e.g., first display 640, second display 650, third display 660, and fourth display 670) where the displays are displaying a presentation from an application program hosted by the first device 610 or second device 620 (or both). In an embodiment, one or more of the plurality of displays (e.g., the first display 640, the second display 650, the third display 660, and the fourth display 670) may further comprise a computing device incorporated within the one or more of the plurality of displays.

As discussed previously, it is contemplated that the interaction of the plurality of devices (e.g., the first device 610 and the second device 620) with the plurality of displays (e.g., first display 640, second display 650, third display 660, and fourth display 670) may be synchronous or asynchronous such that the processing and/or display of touch input data may depend upon a certain or relative ordering or timing. It is further contemplated, as discussed previously, that the interactions of the plurality of devices and the plurality of displays may be either bi-directional or uni-directional (not shown), such that bi-directional interactions may exist between one or more of the plurality of devices and one or more of the plurality of displays in a collaborative few-to-many (e.g., classroom, conference, etc.) environment. For example, the system 600 may comprise a participatory environment that enables real-time interactions between first device 610 and second device 620, possibly including one or more of the plurality of the displays incorporating a computing device, such that the real-time interactions are displayed on the plurality of displays (e.g., first display 640, second display 650, third display 660, and fourth display 670).

Figure 7:
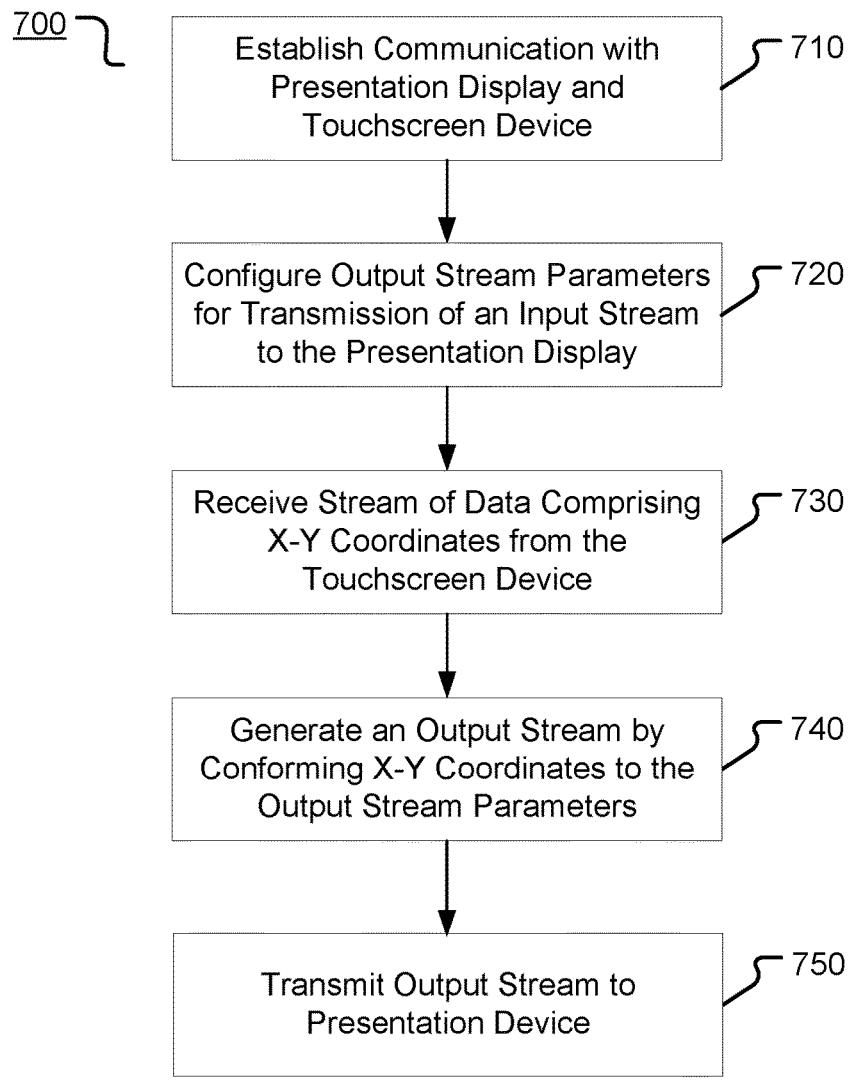
FIG. 7 illustrates a method for transmitting electronic ink data comprising X-Y coordinates according to one or more embodiments.

FIG. 7 illustrates a method for transmitting electronic ink data comprising X-Y coordinates according to one or more embodiments. Method 700 begins at operation 710 in which communications are established with a presentation device and with a touchscreen device. For example, a computing device hosting a presentation in an application program establishes a first communication path with a touchscreen device (e.g., a computing device having a touch-sensitive display). Further to this example, the computing device hosting the presentation in an application program may establish a second communication path with a presentation (e.g., an output) device, for example, including but not limited to an external display, a mobile device or another computing device. The communications between either or both of the touchscreen and presentation devices may be bi-directional or uni-directional, such that the host computing device is at least communicatively coupled to the touchscreen device to receive data representative of touch input and transmit to the presentation device touch output data. In an embodiment, data representative of touch input may include a stream of data, such as a stream of data indicating X-Y coordinates.

Flow of method 700 then proceeds to operation 720 where the computing device hosting the presentation configures one or more output stream parameters for transmitting data received from an input stream for display on a presentation device. In an embodiment, configuring of output stream parameters may comprise adjusting, storing, or otherwise manipulating data necessary for adjusting the resolution or other display characteristics of a received touch input data stream to correspond to a profile or other display characteristics associated with a presentation device (e.g., a display).

For example, the viewable dimensions of a presentation device may be different than the dimensions of the touch-sensitive display of a touchscreen device transmitting the received touch input data stream and thus may comprise configuring output stream parameters (e.g., data) necessary to process the received touch input data and account for the difference in dimensions between the touch-sensitive display and presentation device. As another example, where a touch input data stream may be received such that it corresponds to a video standard or protocol that may require adjustment or translation into another video standard or protocol for displaying the touch input data on a presentation device, configuring output parameters may comprise adjusting, storing, or otherwise manipulating data necessary for adjusting or translating (or both) one or more protocols or standards. As yet another example, the touch input data stream may comprise configuring output stream parameters necessary for adjusting, storing, or otherwise manipulating data for processing to align the received touch input with temporal characteristics of a presentation, such as a time, duration, or period associated with the display of the presentation on a presentation device. In another example, configuring output steam parameters may comprise adjusting, storing or otherwise manipulating data to identify, modify, highlight, or manipulate presentation objects within a generated output stream. One of skill in the art will recognize that configuring output stream parameters may comprise additional or other types of configuration that are encompassed within the scope of the present disclosure, as discussed herein.

Flow of method 700 then proceeds to operation 730 where the computing device hosting a presentation (or a presentation session) in an application program receives a stream of data comprising at least X-Y coordinates from a touchscreen device. For example, the receiving of X-Y coordinates may comprise receiving data indicating an actual, a relative, or a computed location of an X-Y coordinate from a touch-sensitive display. Thus, receipt of an X-Y coordinate may comprise receiving data representing at least two dimensional values (e.g., a data structure representing as integers the X-axis and Y-axis coordinates) that correspond to pixels, for example, of a touch-sensitive display. In another example, operation 730 may comprise receiving X-Y coordinates as relative data that describes the position of a point, line or other touchscreen input data with respect to the relative position of other data, such as touchscreen input data. It is contemplated that many types of data structures may be received, including but not limited to integer and other arrays, two-dimensional tables, etc.

Flow then proceeds to operation 740 where an output stream is generated by conforming X-Y coordinates to the output stream parameters. In an embodiment, conforming of X-Y coordinates may comprise one or more of adjusting the resolution or display characteristics, adjusting the dimensions, translating or adjusting for a protocol or standard, and aligning the received touch input with temporal characteristics of a presentation, such as a time, duration, or period associated with the display of the presentation, on a presentation device. In another embodiment, conforming X-Y coordinates to output stream parameters may comprise algorithmically or programmatically interpreting the received input stream based upon the output stream parameters. For example, conforming X-Y coordinates may comprise analyzing X-Y coordinates to identify vectors, objects, lines, points, and other data. As another example, generating an output stream by conforming X-Y coordinates to output stream parameters may comprise utilizing an application program other than the application program hosting a presentation. As yet another example, generating an output stream by conforming X-Y coordinates to output stream parameters may comprise integrating the received X-Y coordinate data into the output data stream or application program (as the case may be) that displays the presentation itself.

In an embodiment, the output stream generated by operation 740 comprises data different from the data received at operation 730. For example, a generated output stream may represent the received X-Y coordinates using data (e.g., vector graphics) other than the values (e.g., integer values) representing the X-Y coordinates as received. In an embodiment, generation of an output stream may thus comprise conforming X-Y coordinates to vector data, presentation data, or some other type or form of data for displaying touch input based upon the X-Y coordinates within the presentation or on the display. In another embodiment, generation of an output stream comprises conforming X-Y coordinates, or data representing the same, with respect to a plurality of actual or potential presentation device profiles, where each of the actual or potential presentation device profiles may comprise different output parameters corresponding to a plurality of presentation devices. Further to this embodiment, generation of an output stream may comprise packaging the conformed X-Y coordinates, or data representing the same, within one or more data structures for transmission to the plurality of the presentation devices.

Method 700 flow then proceeds to operation 750 in which the generated output stream is transmitted to one or more presentation devices. In an embodiment, a generated output stream, conforming to output stream parameters, is transmitted to a single presentation device. In another embodiment, a plurality of generated output streams, conforming to multiple output stream parameters, are transmitted to a plurality of presentation devices. Further to this embodiment, transmission to a plurality of presentation devices may comprise conforming a received data stream (e.g., a touch input data stream) to various different output stream parameters, e.g., corresponding to configuration differences of different presentation devices.

Figure 8:
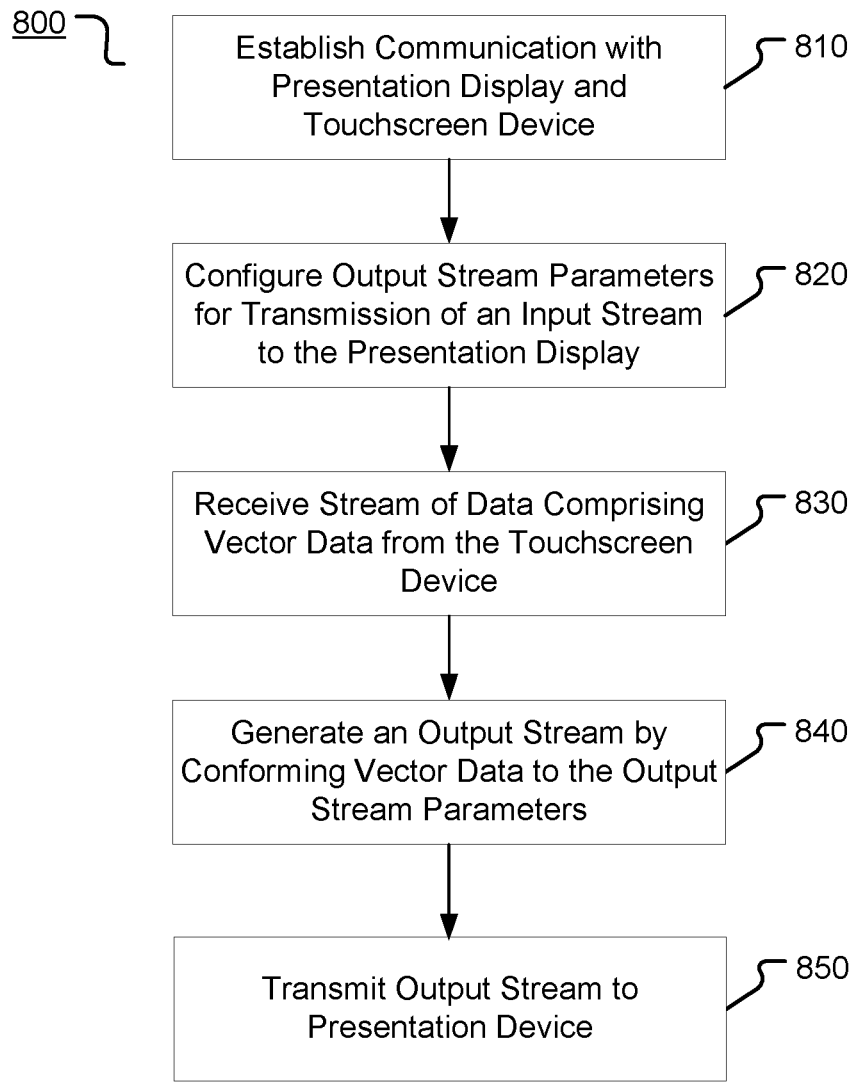
FIG. 8 illustrates a method for transmitting electronic ink data comprising vector data according to one or more embodiments.

FIG. 8 illustrates a method for transmitting electronic ink data comprising vector data according to one or more embodiments. Further to the one or more embodiments discussed with respect to FIG. 7, FIG. 8 provides a method 800 where flow proceeds in operations 810, 820 and 850 in a correspondingly similar manner, respectively, as operations 710, 720, and 750 of FIG. 7. With respect to FIG. 8, flow proceeds to operation 830 in which a stream of vector data is received from a touchscreen device. In an embodiment, the vector data comprises one or more variables having a distance and direction, or objects and data representing the one or more variables. For example, vector data may be comprised of data within an array or other data structure such that the data mathematically describes a position, length, and direction of touch input received based upon user interaction with a touch-sensitive display. Vector data may also comprise data representing objects that are collections of data that mathematically describe a position, length, and direction of the touch input. It is contemplated that a position typically has an actual or relative beginning point and ending point. It is further contemplated that length may be alternatively described as a distance, such as a distance between two points.

Flow then proceeds to operation 840 where an output stream is generated by confirming the stream of vector data to output parameters. In an embodiment, generation of an output stream comprises conforming vector data to X-Y coordinates, presentation data, or some other type or form of data for displaying the vector data within the presentation or on the display. In another embodiment, generation of an output stream comprises conforming vector data with respect to a plurality of actual or potential presentation device profiles, where each of the actual or potential presentation device profiles may comprise different output parameters corresponding to a plurality of presentation devices. Further to this embodiment, generation of an output stream may comprise packaging the conformed vector data within one or more data structures for transmission to the plurality of the presentation devices.

Figure 9:
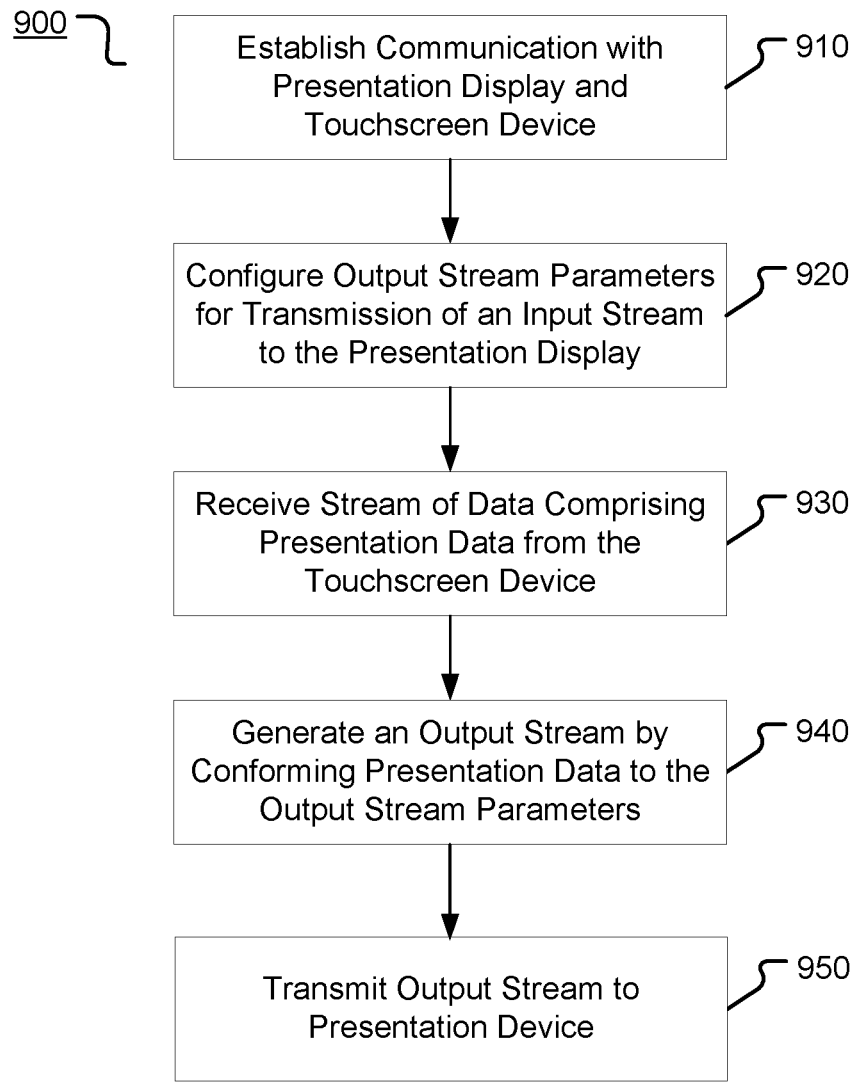
FIG. 9 illustrates a method for transmitting electronic ink data comprising presentation data according to one or more embodiments.

FIG. 9 illustrates a method for transmitting electronic ink data comprising presentation data according to one or more embodiments. Further to the one or more embodiments discussed with respect to FIG. 7, FIG. 9 provides a method 900 where flow proceeds in operations 910, 920 and 950 in a correspondingly similar manner, respectively, as operations 710, 720, and 750 of FIG. 7. With respect to FIG. 9, flow proceeds to operation 930 where a stream of data is received that comprises presentation data from a touch-screen device. In an embodiment, the presentation data comprises one or more objects or data corresponding to an application program or a type of application program file. For example, presentation data may be comprised of data that identifies presentation objects such as geometric patterns, charts, titles, headings, text boxes, media, graphics, pictures, or other objects that correspond to objects from an application program displaying the presentation on an output display.

Flow then proceeds to operation 940 where an output stream is generated by confirming the stream of presentation data to output parameters. In an embodiment, generation of an output stream comprises conforming presentation data to X-Y coordinates, vector data, compatible presentation data, or some other type or form of data for displaying the presentation data within the presentation or on the display. In another embodiment, generation of an output stream comprises conforming presentation data with respect to a plurality of actual or potential presentation device profiles, where each of the actual or potential presentation device profiles may comprise different output parameters corresponding to a plurality of presentation devices. Further to this embodiment, generation of an output stream may comprise packaging the conformed presentation data within one or more data structures for transmission to the plurality of the presentation devices.

Figure 10:
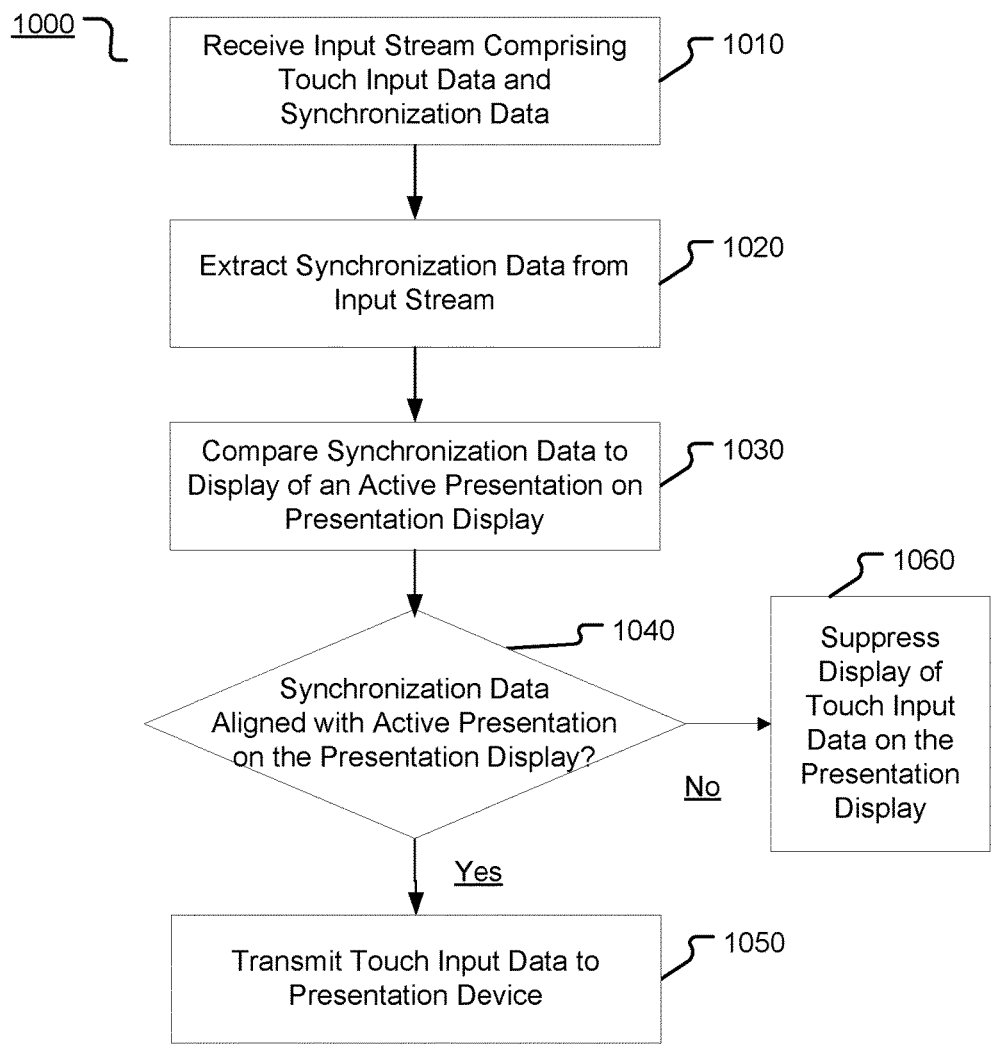
FIG. 10 illustrates a method for synchronizing a presentation with electronic ink data transmitted for display within the presentation according to one or more embodiments.

FIG. 10 illustrates a method for synchronizing a presentation with electronic ink data transmitted for display within the presentation according to one or more embodiments. Method 1000 begins at operation 1010 in which an input stream comprising touch input data and synchronization data is received. In an embodiment, receiving the input stream in operation 1010 comprises receiving as synchronization data numerical or logical representations of temporal values corresponding to the touch input data. In an embodiment, the temporal values corresponding to the touch input data may be processed such that the touch input data may be reconstructed according to temporal values (e.g., according to the time the touch input data was first input by a user).

Flow then proceeds to operation 1020 in which the synchronization data is extracted from the input stream. In an embodiment, extracting the synchronization data comprises filtering for temporal data that corresponds to touch input data within the input stream. One of skill in the art will recognize that other forms of extraction are possible and within the scope of this disclosure.

Flow then proceeds to operation 1030 where a computing device that hosts an active presentation compares the synchronization data against the display of the active presentation. In an embodiment, comparison of the synchronization data against the active presentation comprises determining whether the received touch input data is temporally aligned or misaligned (e.g., being faster or slower) when compared to the temporal status of the active presentation. One of skill in the art will recognize that alignment may comprise comparison of finite temporal values, comparison of a range or ranges of temporal values, or some combination of finite values and ranges. One of skill in the art will also recognize that an error rate or margin may be relied upon when comparing temporal time values and/or ranges, such that a finite value or range may or may not exceed a threshold error rate or margin in order to account for processing delays, network delays, etc.

Flow of method 1000 then proceeds to operation 1040 in which a determination is made whether the received synchronization data is aligned with an active presentation on the presentation display. In embodiments, operation 1040 comprises a determination whether synchronization data (e.g., one or more timestamps) is aligned with a timestamps or other temporal data corresponding to the processing of and/or display of a presentation on the presentation display. In an embodiment, determination of whether synchronization data aligns with an active presentation may comprise a determination that the synchronization meets a predetermined or threshold alignment value or range. Upon determining that synchronization data is aligned with the display of an active presentation on the presentation display, flow proceeds to operation 1050 where the touch input data is transmitted to the presentation device. Upon a determination that synchronization data is mis-aligned with the display of an active presentation on the presentation display, flow proceeds to operation 1060 where display of the touch input data is suppressed. In embodiments, suppression of touch input data according to operation 1060 comprises buffering the touch input data until a subsequent determination is made that the synchronization data aligns with the display of the active presentation. For example, buffering of the synchronization data may comprise waiting for a time period (e.g., several microseconds) until the synchronization data aligns (e.g., meets a time value or range) with the active presentation.

Figure 11:
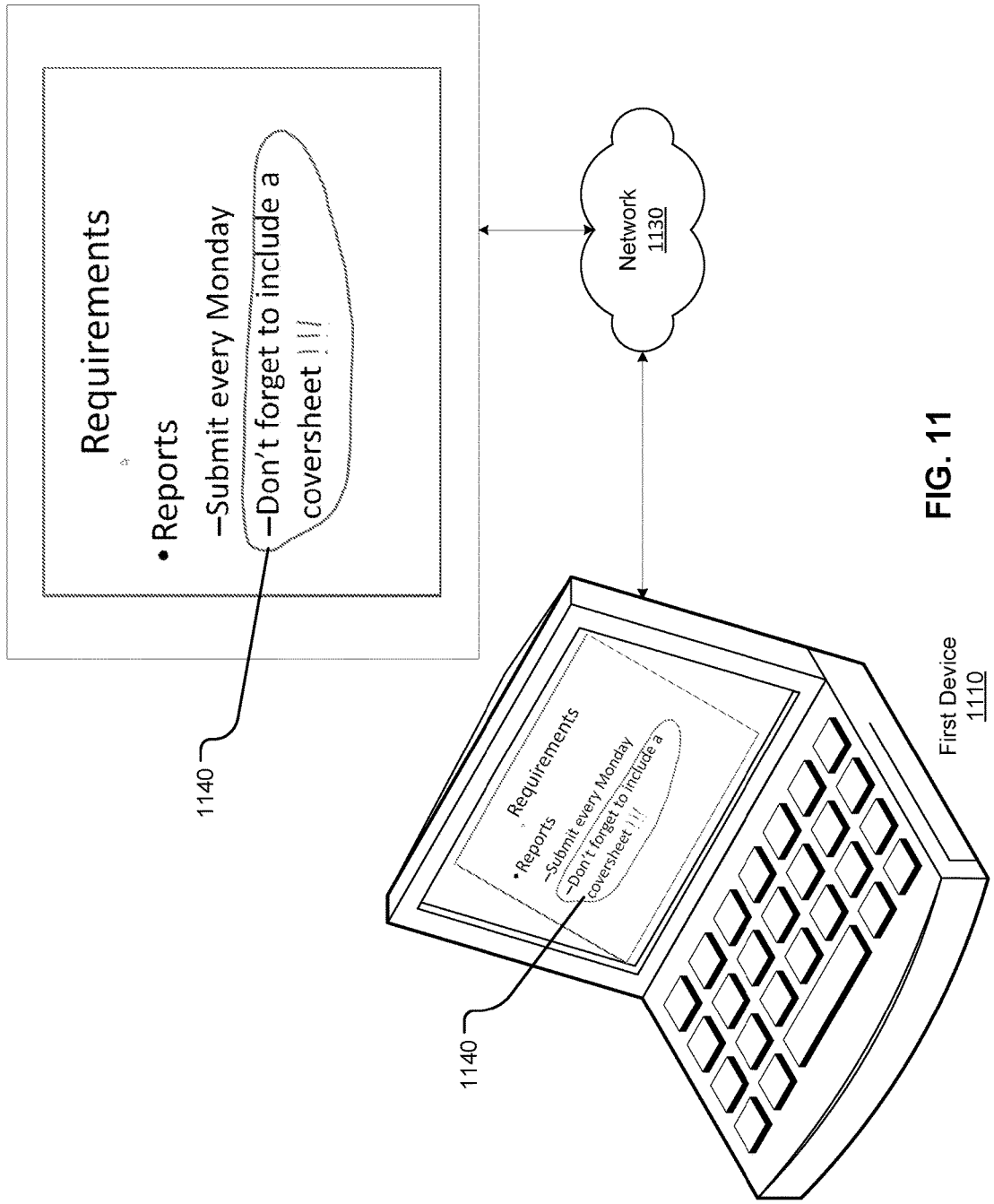
FIG. 11 provides an exemplary illustration of transmitting electronic ink data from a first device to a display comprising a second device according to one or more embodiments.

FIG. 11 provides an exemplary illustration of transmitting electronic ink data from a first device to a display comprising a second device according to one or more embodiments. While the exemplary system 1100 illustrated in FIG. 11 provides a first device 1110 communicating with an external display 1120 via a network connection 1130, one of skill in the art will appreciate that additional devices and/or displays may be included in the system 1100 without departing from the scope of this disclosure. In embodiments, a presentation may be displayed on both the first device 1110 and the external display 1120. In embodiments, the presentation content may be a slide show, a document, a spreadsheet, or any other type content. As illustrated in FIG. 11, ink data input 1140 received at first device 1120 may be displayed on external device 1120 using the various systems and methods described herein.

Figure 12:
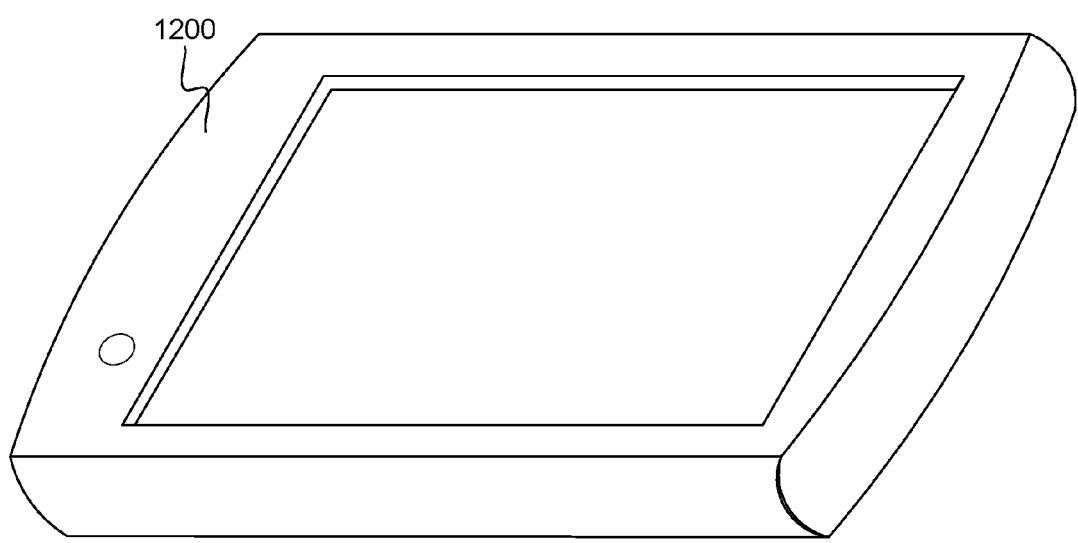
FIG. 12 illustrates a tablet computing device for executing one or more embodiments of the present disclosure.

The embodiments and functionalities described herein may operate via a multitude of computing systems including, without limitation, wired and wireless computing systems, mobile computing systems (e.g., mobile telephones, netbooks, tablet or slate type computers, and laptop computers). FIG. 12 illustrates an exemplary tablet computing device 1200 that may execute one or more embodiments disclosed herein. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 12 through 14B and the associated descriptions provide a discussion of a variety of operating environments in which embodiments of the present disclosure may be practiced. However, the devices and systems illustrated and discussed with respect to FIGS. 12 through 14B are for purposes of example and illustration and are not limiting of a vast number of computing device configurations that may be utilized for practicing embodiments of the present disclosure, described herein.

Figure 13:
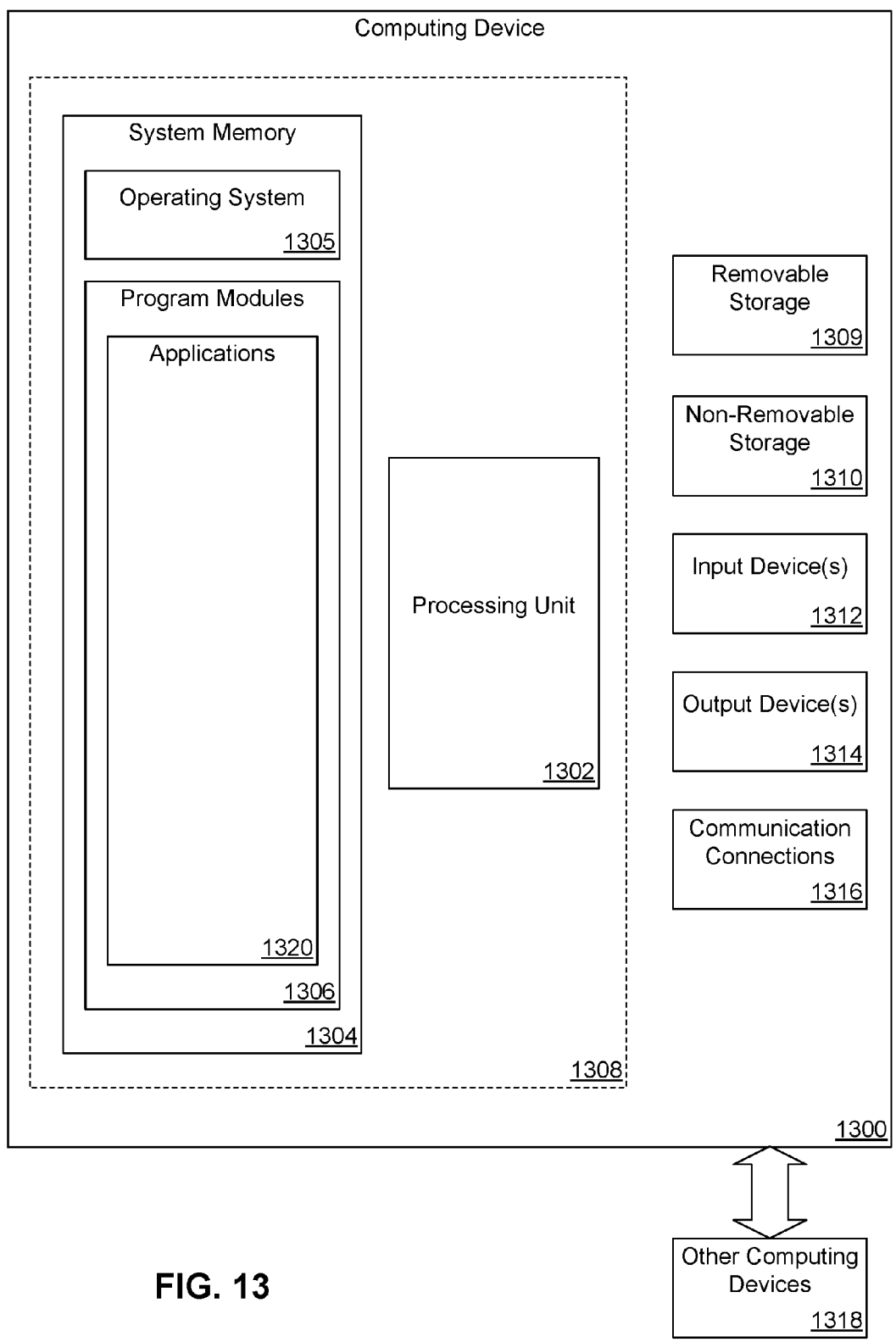
FIG. 13 illustrates a block diagram of a computing environment suitable for implementing one or more embodiments disclosed herein.

FIG. 13 is a block diagram illustrating exemplary physical components of a computing device 1300 with which embodiments of the present disclosure may be practiced. The computing device components described below may be suitable for the computing devices described above. In a basic configuration, the computing device 1300 may include at least one processing unit 1302 and a system memory 1304. Depending on the configuration and type of computing device, the system memory 1304 may comprise, but is not limited to, volatile storage (e.g., random access memory), non-volatile storage (e.g., read-only memory), flash memory, or any combination. The system memory 1304 may include an operating system 1305, one or more program modules 1306, which are suitable for running applications 1320. The operating system 1305, for example, may be suitable for controlling the operation of the computing device 1300. Furthermore, embodiments of the present disclosure may be practiced in conjunction with a graphics library, other operating systems, or any other application program and is not limited to any particular application or system. This basic configuration is illustrated in FIG. 13 by those components within a dashed line 1308. The computing device 1300 may have additional features or functionality. For example, the computing device 1300 may also include additional data storage devices (removable and/or non-removable) such as, for example, magnetic disks, optical disks, or tape. Such additional storage is illustrated in FIG. 13 by a removable storage device 1309 and a non-removable storage device 1310.

As stated above, a number of program modules and data files may be stored in the system memory 1304. While executing on the processing unit 1302, the program modules 1306 may perform processes including, for example, one or more of the stages of the methods described herein. The aforementioned process is an example, and the processing unit 1302 may perform other processes. Other program modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the present disclosure, program modules may include routines, programs, components, data structures, and other types of structures that may perform particular tasks or that may implement particular abstract data types. Moreover, embodiments of the present disclosure may be practiced with other computer system configurations, including hand-held devices, multiprocessor systems, microprocessor-based or programmable consumer electronics, minicomputers, mainframe computers, and the like. Embodiments of the present disclosure may also be practiced in distributed computing environments where tasks are performed by remote processing devices that are linked through a communications network. In a distributed computing environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 13 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 1300 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 1304, the removable storage device 1309, and the non-removable storage device 1310 are all computer storage media examples (e.g., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1300. Any such computer storage media may be part of the computing device 1300. Computer storage media does not include a carrier wave or other propagated or modulated data signal. The computing device 1300 may also have one or more input device(s) 1312 such as a keyboard, a mouse, a pen, a sound input device, a touch input device, etc. The output device(s) 1314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The computing device 1300 may include one or more communication connections 1316 allowing communications with other computing devices 1318. Examples of suitable communication connections 1316 include, but are not limited to, RF transmitter, receiver, and/or transceiver circuitry; universal serial bus (USB), parallel, and/or serial ports.

Figure 14A:
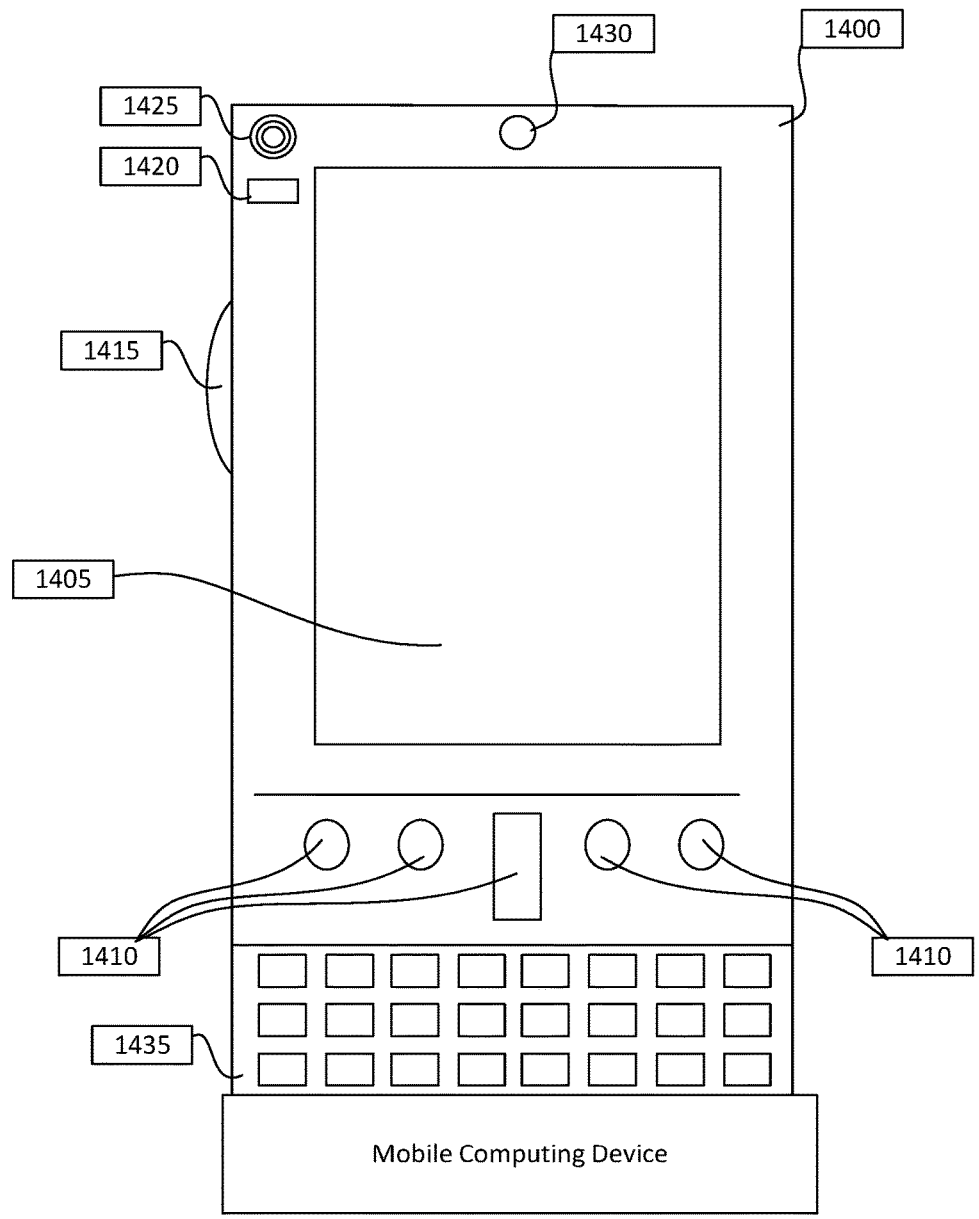
FIG. 14A illustrates one embodiment of a mobile computing device executing one or more embodiments disclosed herein.
Figure 14B:
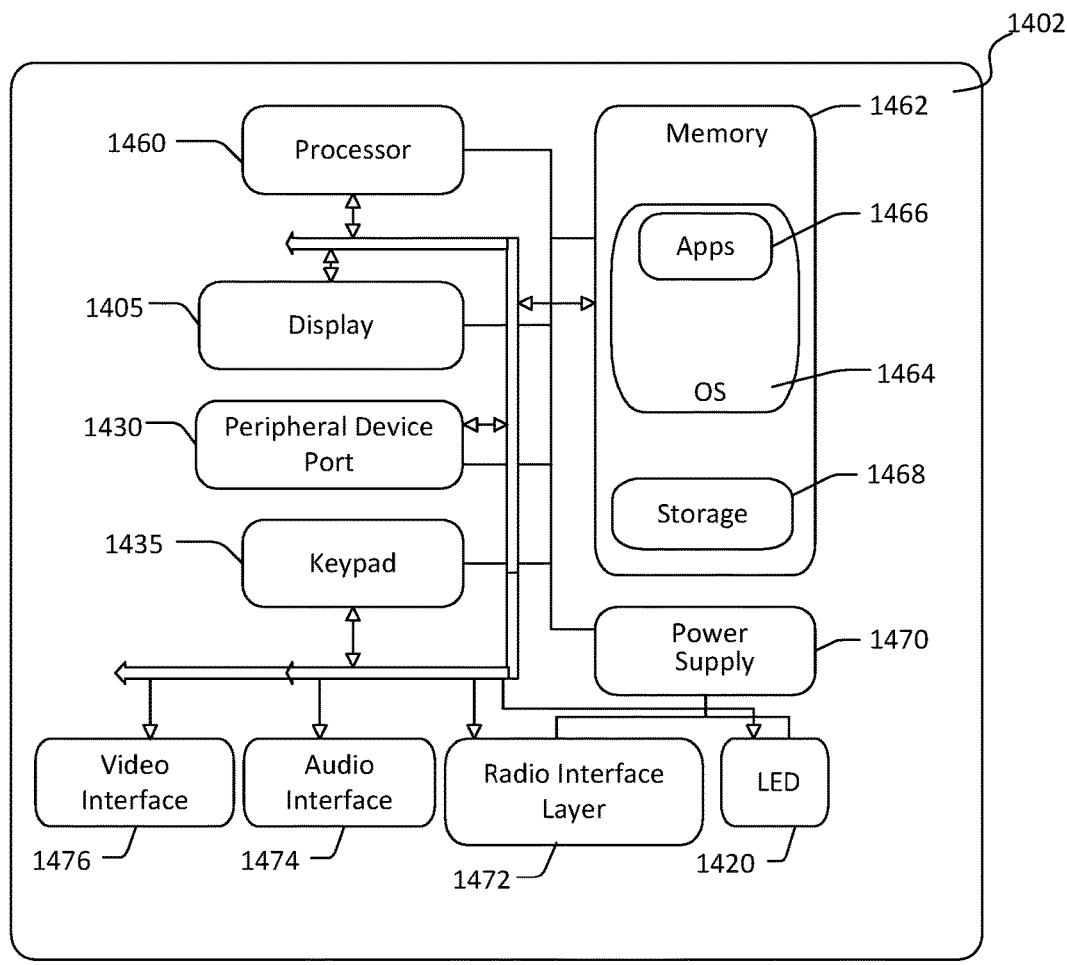
FIG. 14B is a simplified block diagram of an exemplary mobile computing device suitable for practicing one or more embodiments disclosed herein.

FIGS. 14A and 14B illustrate a mobile computing device 1400, for example, a mobile telephone, a smart phone, a tablet personal computer, a laptop computer, and the like, with which embodiments of the present disclosure may be practiced. With reference to FIG. 14A, an exemplary mobile computing device 1400 for implementing the embodiments is illustrated. In a basic configuration, the mobile computing device 1400 is a handheld computer having both input elements and output elements. The mobile computing device 1400 typically includes a display 1405 and one or more input buttons 1410 that allow the user to enter information into the mobile computing device 1400. The display 1405 of the mobile computing device 1400 may also function as an input device (e.g., a touch screen display). If included, an optional side input element 1415 allows further user input. The side input element 1415 may be a rotary switch, a button, or any other type of manual input element. In alternative embodiments, mobile computing device 1400 may incorporate more or less input elements. For example, the display 1405 may not be a touch screen in some embodiments. In yet another alternative embodiment, the mobile computing device 1400 is a portable phone system, such as a cellular phone. The mobile computing device 1400 may also include an optional keypad 1435. Optional keypad 1435 may be a physical keypad or a "soft" keypad generated on the touch screen display. In various embodiments, the output elements include the display 1405 for showing a graphical user interface (GUI), a visual indicator 1420 (e.g., a light emitting diode), and/or an audio transducer 1425 (e.g., a speaker). In some embodiments, the mobile computing device 1400 incorporates a vibration transducer for providing the user with tactile feedback. In yet another embodiment, the mobile computing device 1400 incorporates input and/or output ports, such as an audio input (e.g., a microphone jack), an audio output (e.g., a headphone jack), and a video output (e.g., a HDMI port) for sending signals to or receiving signals from an external device.

Although described herein in combination with the mobile computing device 1400, in alternative embodiments, features of the present disclosure may be used in combination with any number of computer systems, such as desktop environments, laptop or notebook computer systems, multiprocessor systems, micro-processor based or programmable consumer electronics, network PCs, mini computers, main frame computers and the like. Embodiments of the present disclosure may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present disclosure.

FIG. 14B is a block diagram illustrating the architecture of one embodiment of a mobile computing device. That is, the mobile computing device 1400 can incorporate a system (e.g., an architecture) 1402 to implement some embodiments. In one embodiment, the system 1402 is implemented as a "smart phone" capable of running one or more applications (e.g., browser, e-mail, calendaring, contact managers, messaging clients, games, and media clients/players). In some embodiments, the system 1402 is integrated as a computing device, such as an integrated personal digital assistant (PDA) and wireless phone.

One or more application programs 1466 may be loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, and so forth. The system 1402 also includes a non-volatile storage area 1468 within the memory 1462. The non-volatile storage area 1468 may be used to store persistent information that should not be lost if the system 1402 is powered down. The application programs 1466 may use and store information in the non-volatile storage area 1468, such as e-mail or other messages used by an e-mail application, and the like. A synchronization application (not shown) also resides on the system 1402 and is programmed to interact with a corresponding synchronization application resident on a host computer to keep the information stored in the non-volatile storage area 1468 synchronized with corresponding information stored at the host computer. As should be appreciated, other applications may be loaded into the memory 1462 and run on the mobile computing device 1400.

The system 1402 has a power supply 1470, which may be implemented as one or more batteries. The power supply 1470 might further include an external power source, such as an AC adapter or a powered docking cradle that supplements or recharges the batteries.

The system 1402 may also include a radio 1472 that performs the function of transmitting and receiving radio frequency communications. The radio 1472 facilitates wireless connectivity between the system 1402 and the "outside world", via a communications carrier or service provider. Transmissions to and from the radio 1472 are conducted under control of the operating system 1464. In other words, communications received by the radio 1472 may be disseminated to the application programs 1466 via the operating system 1464, and vice versa.

The visual indicator 1420 may be used to provide visual notifications, and/or an audio interface 1474 may be used for producing audible notifications via the audio transducer 1425. In the illustrated embodiment, the visual indicator 1420 is a light emitting diode (LED) and the audio transducer 1425 is a speaker. These devices may be directly coupled to the power supply 1470 so that when activated, they remain on for a duration dictated by the notification mechanism even though the processor 1460 and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1425, the audio interface 1474 may also be coupled to a microphone to receive audible input, such as to facilitate a telephone conversation. In accordance with embodiments of the present disclosure, the microphone may also serve as an audio sensor to facilitate control of notifications, as will be described below. The system 1402 may further include a video interface 1476 that enables an operation of an on-board camera 1430 to record still images, video stream, and the like.

A mobile computing device 1400 implementing the system 1402 may have additional features or functionality. For example, the mobile computing device 1400 may also include additional data storage devices (removable and/or non-removable) such as, magnetic disks, optical disks, or tape. Such additional storage is illustrated in FIG. 14B by the non-volatile storage area 1468.

Data/information generated or captured by the mobile computing device 1400 and stored via the system 1402 may be stored locally on the mobile computing device 1400, as described above, or the data may be stored on any number of storage media that may be accessed by the device via the radio 1472 or via a wired connection between the mobile computing device 1400 and a separate computing device associated with the mobile computing device 1400, for example, a server computer in a distributed computing network, such as the Internet. As should be appreciated such data/information may be accessed via the mobile computing device 1400 via the radio 1472 or via a distributed computing network. Similarly, such data/information may be readily transferred between computing devices for storage and use according to well-known data/information transfer and storage means, including electronic mail and collaborative data/information sharing systems.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

I claim:

1. A method for transmitting to a display communicatively coupled to a first device electronic ink data received from a second device, the method comprising:
   receiving input data at the first device having a first display characteristic, wherein the input data comprises touch data received at the second device having a second display characteristic different from the first display characteristic;
   extracting temporal data from the input stream;
   translating the input data based on at least one output parameter associated with the first display characteristic;
   generating electronic ink output data based on the translation of the input data and the extracted temporal data; and
   transmitting the electronic ink output data to the first display based on the extracted temporal data.

2. The method of claim 1, wherein the input data is selected from a group consisting of: X-Y coordinates, vector graphics, and presentation data.

3. The method of claim 1, wherein generating electronic ink output data comprises integrating the electronic ink output data with presentation content and wherein transmitting the electronic ink output data to the display comprises transmitting the electronic ink output data and the presentation content to the display.

4. The method of claim 1, wherein the at least one output parameter corresponds to a display profile that comprises a plurality of display characteristics associated with the display.

5. The method of claim 1, wherein the input data is received by the first device via a wireless network connection.

6. The method of claim 1, further comprising:
   synchronizing the electronic ink output data with presentation content for transmission to the display.

7. The method of claim 1, wherein the input data and the electronic ink output data correspond to presentation content displayed on the first device and the second device.

8. A system comprising:
   a first device;
   a display communicatively coupled to the first device;
   a second device comprising a touch-sensitive display; and
   wherein the first device comprises:
      one or more processors; and
      a memory coupled to the one or more processors, the memory for storing instructions which, when executed by the one or more processors, performs a method for transmitting to the display electronic ink data received from the second device, the method comprising:
         receiving input data at the first device having a first display characteristic, wherein the input data comprises touch data received at the second device having a second display characteristic different from the first display characteristic;
         extracting temporal data from the input stream;
         translating the input data based on at least one output parameter associated with the first display characteristic;
         generating electronic ink output data based on the translation of the input data and the extracted temporal data; and transmitting the electronic ink output data to the first display based on the extracted temporal data.

9. The system of claim 8, wherein the input data is selected from a group consisting of: X-Y coordinates, vector graphics, and presentation data.

10. The system of claim 8, wherein generating electronic ink output data comprises integrating the electronic ink output data with presentation content, and wherein transmitting the electronic ink output data to the display comprises transmitting the electronic ink output data and the presentation content to the display.

11. The system of claim 8, wherein the at least one output parameter corresponds to a display profile that comprises a plurality of display characteristics associated with the display.

12. The system of claim 8, wherein the method further comprising:
synchronizing the electronic ink output data with presentation content for transmission to the display.

13. The system of claim 8, wherein the input data and the electronic ink output data correspond to a presentation displayed on the first device and the second device.

14. A computer-readable storage medium storing instructions that, when executed by on one or more processors, performs a method for transmitting to a display communicatively coupled to a first device electronic ink data received from a second device, the method comprising:
receiving input data at the first device having a first display characteristic, wherein the input data comprises touch data received at the second device having a second display characteristic different from the first display characteristic;
extracting temporal data from the input stream;
translating the input data based on at least one output parameter associated with the first display characteristic;
generating electronic ink output data based on the translation of the input data and the extracted temporal data; and
transmitting the electronic ink output data to the first display based on the extracted temporal data.

15. The method of claim 14, wherein the input data is selected from a group consisting of: X-Y coordinates, vector graphics, and presentation data.

16. The method of claim 14, wherein generating electronic ink output data comprises integrating the electronic ink output data with presentation content and wherein transmitting the electronic ink output data to the display comprises transmitting the electronic ink output data and the presentation content to the display.

17. The method of claim 14, wherein the at least one output parameter corresponds to a display profile that comprises a plurality of display characteristics associated with the display.

18. The method of claim 14, wherein the input data is received by the first device via a wireless network connection.

19. The method of claim 14, further comprising:
synchronizing the electronic ink output data with presentation content for transmission to the display.

20. The method of claim 14, wherein the input data and the electronic ink output data correspond to presentation content displayed on the first device and the second device.

* * * * *